US012005837B2

(12) United States Patent
Herman et al.

(10) Patent No.: US 12,005,837 B2
(45) Date of Patent: Jun. 11, 2024

(54) ENHANCED ILLUMINATION-INVARIANT IMAGING

(71) Applicant: Ford Global Technologies, LLC, Dearborn, MI (US)

(72) Inventors: David Michael Herman, West Bloomfield, MI (US); Akshay Vaidya, Canton, MI (US); Larry Sanders, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 17/396,027

(22) Filed: Aug. 6, 2021

(65) Prior Publication Data
US 2023/0048410 A1 Feb. 16, 2023

(51) Int. Cl.
| G06T 7/73 | (2017.01) |
| B60Q 1/22 | (2006.01) |
| B60R 1/00 | (2022.01) |
| F21L 4/00 | (2006.01) |
| H04N 23/611 | (2023.01) |
| H04N 23/80 | (2023.01) |

(52) U.S. Cl.
CPC ............. B60R 1/003 (2013.01); B60Q 1/22 (2013.01); F21L 4/005 (2013.01); G06T 7/73 (2017.01); H04N 23/611 (2023.01); H04N 23/80 (2023.01); *G06T 2207/30252* (2013.01)

(58) Field of Classification Search
None
See application file for complete search history.

(56) References Cited

U.S. PATENT DOCUMENTS

| 9,464,887 | B2 | 10/2016 | Salter et al. | |
| 9,959,792 | B2 | 5/2018 | Singireddy | |
| 10,755,613 | B2 | 8/2020 | Brubaker | |
| 10,858,042 | B2 | 12/2020 | Lu et al. | |
| 2017/0337709 | A1* | 11/2017 | Duchene | G06T 7/11 |
| 2018/0009367 | A1* | 1/2018 | Lee | F21S 41/285 |
| 2020/0175659 | A1* | 6/2020 | Rakshit | G06T 5/009 |

(Continued)

FOREIGN PATENT DOCUMENTS

| DE | 102019213826 A1 * | 3/2021 |
| KR | 20200135647 A * | 12/2020 |

OTHER PUBLICATIONS https://stackoverflow.com/questions/46990838/numpy-transforming-rgb-image-to-yiq-color-space.*

(Continued)

*Primary Examiner* — Shadan E Haghani
(74) *Attorney, Agent, or Firm* — Frank Lollo; Eversheds Sutherland (US) LLP (57) ABSTRACT

Devices, systems, and methods for generating illumination-invariant images are disclosed. A method may include activating, by a device, a camera to capture first image data; while the camera is capturing the first image data, activating of a first, light source; receiving the first image data, the first image data having pixels having first color values; identifying first light generated by the first light source while the camera is capturing the first image data; identifying, based on the first image data, second light generated by a second light source; generating, based on the first light and the second light, second image data that are illumination-invariant; and presenting the second image data.

16 Claims, 6 Drawing Sheets

(56) References Cited

U.S. PATENT DOCUMENTS

| | | | |
|---|---|---|---|
| 2021/0176412 A1* | 6/2021 | Yoon | G01J 3/0264 |
| 2021/0183026 A1* | 6/2021 | Auner | G06T 5/008 |
| 2022/0262005 A1* | 8/2022 | Bleyer | G06T 5/50 |

OTHER PUBLICATIONS

Ratnasingam (NPL "Study of the photodetector characteristics of a camera for color constancy in natural scenes," Optical Society of America (2010)).*

Julia Diaz-Escobar et al, "LUIFT: LUminance Invariant Feature Transform", Hindawi, Mathematical Problems in Engineering, vol. 2018, Article ID 3758102, published Oct. 28, 2018, 18 pages.

\* cited by examiner

ENHANCED ILLUMINATION-INVARIANT IMAGING

BACKGROUND

People increasingly are using vehicles and mobile devices to generate images. Color consistency and representation in low-light conditions in which images may be captured may be undermined, resulting in reduced image quality. In addition, some devices and people (e.g., people operating vehicles or other machines) rely on image data, so the performance of devices relying on image data may be undermined by poor image quality caused by low-light conditions.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

People and devices increasingly are relying on images when making decisions. For example, operation of a vehicle may depend on captured image data, whether the vehicle is operated by a human driver or automatically (e.g., an autonomous vehicle). In addition, the logic and outputs of some vehicle systems and other computers may depend on image data. For example, advance driver assistance systems (ADAS) of vehicles may rely at least partially on image data.

When images are captured in low-light settings, such as at night, dusk, in a tunnel, underneath an underpass, and the like, the quality of image data of the images may be undermined or may include shadows. In addition to degrading the visual aesthetics of captured images, the poor image quality may undermine the performance of computer vision (CV) and other image-based algorithms that may rely on the image data to generate outputs. The problem increasingly is observable by a vehicle driver as image color representation and the size of interior vehicle displays increases and improves, or as vehicle perception increasingly drives vehicle actuation. Increasing vehicle features relying on robust vision data may benefit from an improved ability to operate under low-light conditions.

For example, humans recognize color consistency—perceiving colors of objects correctly even under colored illumination (e.g., when wearing sunglasses). However, that perception may be undermined when a photograph is taken under one type of lighting, and the person views the photograph under different lighting (e.g., the photograph may appear tinted). To correct for this perceptual effect, some cameras may adjust the colors of images to partially or completely compensate for a dominant color of the illumination (e.g., often referred to as "color temperature"), effectively shifting colors in an image to appear as if the photographed scene was illuminated by neutral (e.g., white) light. This process may be referred to as "auto white balancing." In this manner, the default bias of a sensor may be corrected to drive images toward unrealistic color spaces based on sensor sensitivities and a demosiacing process.

Some image-based vehicle technologies, such as an auto-hitch feature that allows a vehicle to connect a vehicle hitch to an object (e.g., another vehicle, a trailer, etc.), may inspect a captured image (e.g., captured by a vehicle camera) and operate under an assumption regarding image formation to estimate ambient illumination characteristics. Other image-based vehicle technologies include remote parking, valet parking modes, and the like. For example, some techniques may assume certain illuminant properties based on the obtained image characteristics. In low-light conditions, the color response of a camera often is noisier, and some assumptions regarding ambient illumination may be incorrect (e.g., blue tinted lighting rather than solar illumination, such as Planckian)). Automotive cameras often include a sensor configuration with clear pixels or near-infrared (NIR) filtered pixels (e.g., high sensitivity and/or nighttime operation with an NIR illuminator) that require demosaicing in the color space where interpolation is more confounded and/or ill-defined. In the ease of multi-camera imaging where the resulting images may be stitched together, this process may be prone to error resulting in poor aesthetic appearance. In addition, shadows may result in features that are undesirable (e.g., edges/features which may be predicted as an object or depth).

In particular, actuating a vehicle in reverse to a trailer behind the vehicle to attach the vehicle's hitch to a trailer tongue may be challenging.

However, some existing techniques may produce results that may be insufficient for vehicle operations and for human user experience. For example, in the case of vehicle actuation, whether controlled by human perception of an image or computer algorithm analysis of an image, some existing techniques may result in undesirable vehicle operations, such as a human driver using surround view to detect objects while navigating a vehicle in low-light conditions. Some feature detection techniques may be susceptible to failure when a camera image includes shadows of nearby objects, static or dynamic shadows by ambient light sources, and the like.

Therefore, people and devices may benefit from generation and use of illumination-invariant images in low-light scenarios.

In one or more embodiments, in low-light situations, exterior vehicle illumination for image capturing may be augmented with vehicle lights to provide more stability to CV and other image analysis models that analyze the captured image data of vehicle cameras and/or user devices.

With the presence of vehicle illuminators on a vehicle, the total illumination color characteristics may be influenced, allowing for an improved identification of color in an image, and therefore improving, the presentation of the image. This relationship can be used to obtain both the ambient illumination and material color characteristics. With this information, color correction (e.g., white balance and tone correction) can be improved. The improvement may apply to single or multi-camera imaging for both human viewing and machine algorithms for both vehicle and smart devices. For example, cameras may include charged coupled devices, complementary metal oxide semiconductors, polarimetric cameras, event cameras, light-field cameras, time of flight cameras, monocular cameras, stereo cameras, wide-angle cameras, telephoto cameras, periscope cameras, and the like. Using ambient illumination and vehicle actuation, the present disclosure provides for the generation of a stable illumination-invariant image (e.g., an image insensitive to shadows from nearby objects, such as tree leaves, etc.). The stable illumination-invariant image may be applicable to non-vehicle applications as well, such as mobile phone applications used for three-dimensional mapping.

In one or more embodiments, a vehicle camera or device camera may detect low-light conditions (e.g., based on a light sensor, camera settings, user settings, time, of day, etc.). A vehicle camera (e.g., a rear-view camera) may capture image data of a scene exterior to the vehicle. Processing devices may determine a three-dimensional scene based on the image data to estimate geometry between the vehicle and a vehicle and an object. To determine the multi-dimensional scene, the processing devices may use a multi-view stereo technique with assistance from a rear-camera, under-mirror camera, and/or center high-mounted stop lamp (CHMSL) camera (e.g., aimed at a truck bed or behind a vehicle). Assuming that a scene does not change, the processing devices may use monocular depth perception/depth estimation. Time-of-flight (ToF) data from a vehicle camera or mobile device camera may be used by the processing devices to determine object distance from a camera. Other techniques to estimate depth may be utilized (e.g., the light magnitude response from vehicle lighting may be useful assuming a uniform reflectivity of a scene).

In one or more embodiments, a vehicle or other device may illuminate a scene (e.g., using vehicle lights, device flashlights, etc.) using varying color and/or intensity levels over a short period of time so that the color variation occurs at rates faster than human eyes may detect (e.g., greater than 240 Hz). A location of an illuminant also may vary by selecting a source light (e.g., within a vehicle's tail light complex), for example, by using individual lighting within a light emitting diode (LED) strip on a vehicle's tail (e.g., compliant with government regulations regarding tail lights not changing illumination). Rapidly changing the color of a tail light would appear to a human observer as white light when pulsed in rapid succession. Because a reverse tail light may be required to be white, such rapid pulsing would comply with relevant regulations. Once there is enough image data to accurately estimate a trailer or other object's position in an image scene, the vehicle may stop flashing lights (e.g., to allow a next step for an auto-hitch process, such as maneuvering a vehicle to a linear regression of a camera response, using a random sample consensus or another algorithm). A device may account for rolling shutter effects and may align light pulsing with rolling shutter. As a result, the techniques presented herein would comply with government regulations governing the changing of vehicle illumination and will satisfy user preferences.

In one or more embodiments, based on the captured image data and the known light from an activated light source of a vehicle or another device, a device may identify ambient illumination in the captured image data, and may convert the image data to an illumination-invariant image. The vehicle or another device may use the illumination-invariant image for operations. For example, a vehicle may use computer vision models for determining how to actuate a vehicle, such as for an autohitch process. Based on the computer vision models and other models (e.g., planning models), the device may cause actuation of a vehicle.

In one or more embodiments, to alleviate the challenges of attaching a vehicle trailer hitch to a trailer tongue, a vehicle automatically may be reversed to the trailer close enough to allow a user to drop the trailer onto the hitch. A perception model may use a vehicle camera and radars fitted to the exterior of the vehicle to detect the trailer and provide the position and velocity of the trailer tongue (e.g., with respect to the hitch ball) to a system of the vehicle. The autohitch feature may detect a trailer even with shadows overshadowing the trailer. The shadows may be static (e.g., from a building or other static structure), transient (e.g., from the vehicle), or flickering (e.g., from tree leaves in the wind).

In one or more embodiments, an illumination-invariant imaging technique may convert color image space of images into an illumination-invariant color space, which may be used to determine feature points for tracking and object detection. The illumination-invariant color space may stabilize pixel representation of an image scene across day times or night times when an illuminator may be moving or changing colors (e.g., other vehicle lights), resulting in significant reduction, in variability due to sunlight and shadows, and resulting in an amplitude image in which pixel intensity values depend on material properties of objects in the image scene. As a result, optical techniques may perform better across different lighting conditions to detect objects, such as a trailer tongue and hitch. Some limitations may apply. To mitigate the limitation, a device may determine the ambient illumination before performing feature detection techniques. The device may identify the ambient illumination by manipulating controllable light sources (e.g., a vehicle tail light, a device flashlight, etc.). In this manner, the device may determine color and/or ambient illumination color in, an environment during low-light conditions in which the device has no prior data indicating illumination. When low-light conditions, heavy shading conditions, or flickering of objects are not present, other computer vision techniques may be applied with illumination-invariant methods that assume solar radiation.

In one or more embodiments, a vehicle user may activate an autohitch feature to assist the user with hitching the vehicle to a trailer. It may be assumed that a camera response is calibrated to sensor quantum efficiency behavior as a function of color. A camera may capture a scene, and the device may convert the image data to luminescence image data based on a camera property such as exposure duration or quantum efficiency. The device may analyze the image data to estimate the geometry between the vehicle and trailer, including a depth map per pixel. To analyze the three-dimensional scene, the device may use (1) a multi-view stereo technique with help of a vehicle camera; (2) a structure from motion technique: assuming a scene does not change, the device may use (4) monocular depth perception/depth estimation technique; and (3) a photometric stereo technique that may be used to estimate distance between the vehicle and a sensed object. Using the generated image as an input to an object detection model, the device may detect an object (e.g., a trailer). The device also may detect the position of light sources within an image frame, the intensity of light sources, and/or the color of light sources. In some situations, the light source may be outside of the field of view of a camera, so the device may assume a lighting direction. The device also may apply a semantic segmentation to improve any prior knowledge of a color response of objects (e.g., grass being green) to validate color changes that occur based on vehicle lighting actuation.

In one or more embodiments, in bright ambient illumination conditions (e.g., sunlight), the device may use prior knowledge of an environment to estimate the color-temperature of an illumination. For example, using any combination of time-of-day data, location data, vehicle pose data, weather data, etc., the device may generate the illumination-invariant image using transformation parameters (e.g., found in a look-up table). Alternatively, fusing radar detections with a camera-based method may improve detection. For example, when a scene includes heavy particles like leaves on a road surface, the detection techniques may depend on radar detections by increasing the weight of radar detection data considered in the object detection models.

In one or more embodiments, a photometrically linear input image from a camera may be represented as I, having a black level of zero and no saturated pixels. Each pixel k's red, green, blue (RGB) value in image I may be assumed to be a product of the pixel's "true" white-balanced RGB value $W^{(k)}$ and some global RGB illumination L shared by all pixels according to Equation (1) below:

$$\forall_k \begin{bmatrix} I_r^{(k)} \\ I_g^{(k)} \\ I_b^{(k)} \end{bmatrix} = \begin{bmatrix} W_r^{(k)} \\ W_g^{(k)} \\ W_b^{(k)} \end{bmatrix} \circ \begin{bmatrix} L_r \\ L_g \\ L_b \end{bmatrix} \quad (1)$$

A task of color consistency is to use the input image I to estimate the global RGB illumination L, and use L to generate $$W^{(k)} = \frac{I^{(k)}}{L}.$$

In this manner, illumination color is a critical component in the color shift observed in images and as an input to generate an illumination invariant image.

In one or more embodiments, when using a tail light as a controllable light source for exterior vehicle illumination, the input image I may be a sum of tail light intensity and external illuminant intensity (e.g., street lighting, other ambient lighting, other vehicle lighting, other device lighting, etc.). The camera response (e.g., to ambient light and surface reflectivity of an object in the field of view) may be represented by Equation (2) below:

$$R^{x,E} = a^x \cdot n^x I^x S^x(\lambda_i) E^x(\lambda_i) \quad (2),$$

where:
(a,n)—the unit, vectors are geometry term;
E(λ)—the power spectral density of the external lighting:
S(λ)—the unknown reflectivity of the object in field of view (i.e. trailer);
F(λ)—spectral sensitivity at location x in the frame; and
$R^x$—camera response of the scene.

Of the above terms, $R^{x,E}$ may be measured by extracting the RGB color values of any pixel/location in space, and the geometry (a,n) may be manipulated by moving a vehicle with respect to a trailer or another object. I and E(λ) can be changed by manipulating the intensity and frequency (color) of the light being projected by the tail light. The surface reflectivity term S(λ) may correlate with I, which is composed of surrounding illuminant as well as the tail light. By calculating S(λ) across multiple scenarios produced by manipulating above terms, a device may determine the component of I that is from an external lighting source, and therefore identify the ambient illuminant.

In one or more embodiments, Equation (2) above may be expanded as in Equation (3) below to include an additional light source, such as the tail light (e.g., represented by L1) compared to an ambient light source, such as an overhead street lamp (e.g., L0):

$$R^{x,E} = \left( a^{L0} \cdot n^x I^{L0} E^{L0}(\lambda_i) + a^{L1} \cdot n^x \frac{I^{L1} E^{L1}(\lambda_i)}{4\pi d^2} \right) * S^x(\lambda_i), \quad (3)$$

where:
$I^{L0} E^{L0}(\lambda_i)$ is the ambient illumination in the scene which may be composed of a single or multiple light sources. $I^{L0} E^{L0}(\lambda_i)$ may be expanded as needed for multiple light sources to generate more exact calculation. $I^{L1}$ is the source light, e.g. tail light, $E^{L1}(\lambda_i)$ is the color of the tail light, d is the distance between the light source/camera to the pixel coordinate in 3-D space. In the present example, the camera may be co-located together, but d may be modified to account for different positions of camera and light source, e.g. $d^4 \sim d_{L0}^2 d_R^2$. $a^{L0} \cdot n^x$ accounts for the geometric properties affecting light interaction of the light source with the material. In Equation (3), Lambertian dispersion may be assumed, e.g. diffuse reflectance, where the percentage reflection control by geometry can be described as, cos(α), where a is the angle of the surface relative to the camera/light source pair. Other bidirectional reflectance functions (BRDF) may be used. Further, this derivation assumes that the light source is a point source emitter, although it may be likely that the tail light includes a lens that may affect the radial power distribution. In some embodiments, the power density of a light emitting diode (LED) lens can be incorporated, e.g. $I^{L1} \sim I^{L1}(n^{LED})$, where there may exist a lookup table that describes the power density per vector direction for the light source given some voltage, duty cycle, or other LED operating conditions. Known and unknown terms of Equation (3) are shown below in Table 1:

TABLE 1

| Terms in Equation (3): | | |
| --- | --- | --- |
| Term | Status | Method |
| $a^{Li}$, $n^x$ | Estimated in situ | Depth estimation methods |
| $R^{x, E}$ | measured in situ | Extract R, G, B per each pixel/location in space |
| $I^{L1} E^{L1}(\lambda_i)$ | Controlled by vehicle lighting (e.g. body control module) | BCM control |
| d | Estimated in situ | Depth estimation methods |
| $I^{L0}$, $E^{L0}(\lambda_i)$ | Unknown or estimable | when light source(s) is in view of the camera the camera may estimate power |

TABLE 1-continued

Terms in Equation (3):

| Term | Status | Method |
|---|---|---|
| | | and color to apply some prior knowledge on the linear regression. |
| α | Unknown | |

In one or more embodiments, using Equation (3) above, a device may take the log of both sides to separate color from lighting using Equation (4) below:

$$\log(R^{x,E}) = \log(a^{L0} \cdot n^x I^{L0} E^{L0}(\lambda_i)) \quad (4).$$

In one or more embodiments, the device may resolve Equation (4) to Equation (5) below:

$$\Delta \log(R^{x,E}) = \log\left(a^{L0} \cdot n^x I^{L0} E^{L0}(\lambda_i) + a^{L1} \cdot n^x \frac{I^{L1} E^{L1}(\lambda_i)}{4\pi d^2}\right) - \log(a^{L0} \cdot n^x I^{L0} E^{L0}(\lambda_i)) \quad (5)$$

In one or more embodiments, the device may resolve Equation (5) to Equation (6) below:

$$\Delta \log(R^{x,E}) = \log\left(1 + \frac{1}{4\pi d^2} \cdot \frac{a^{L1} I^{L1} E^{L1}(\lambda_i)}{a^{L0} I^{L0} E^{L0}(\lambda_i)}\right) \quad (6)$$

In one or more embodiments, the device may sample enough times where the controlled light source (e.g., vehicle illuminator) settings are varied to allow the device to determine $I^{L0} E^{L0}(\lambda_i)$ (e.g., using a system of equations). There may be multiple methods for generating a representation of an illumination-invariant color space conversion. For example, one method may apply Equation (7) below:

$$I = \log(R_2) - \alpha \log(RR_1) - \beta \log(R_3) \quad (7).$$

In one or more embodiments, once a spectral power density has been estimated within a sensor domain, the device may correct the acquired image data to represent the image as if it had been captured under a known light source. The transformation may be performed according to Equation (8) below:

$$R^{x,C} = D^{E,C} R^{x,E} \quad (8)$$

where $R^{x,E}$ may represent the image captured in an unknown light source, and $R^{x,C}$ may represent the transformed image as if captured under a canonical illuminant, while $D^{E,C}$ may represent a spectral adaptation transform matrix, which may map colors from the captured image to corresponding colors under a known illumination. The device may transform from arbitrary illumination image data to a Planckian illuminant.

In one or more embodiments, once in a canonical color space, per pixel, the device may convert the image data to an illumination-invariant image using Equation (9) below:

$$I = \log(R_2) - \alpha \log(R_1) - (1-\alpha)\log(R_3) \quad (9)$$

Equation (9) is an example method to determine I, but other numerical methods may be used.

In one or more embodiments, processing devices may determine the accuracy of the illumination-invariant solution per pixel by applying the following method: The distance of an object (e.g., an object represented by an image pixel) from the vehicle may affect, whether a perceived color change is caused by illuminating the vehicle light. For example, the sky may remain dark with or without vehicle illumination, so a device may not be able to rely on some pixels. In such situation, $\Delta \log(R^{x,E})$ may be examined, and the device may apply a mask of pixels with a threshold value that is X above the chromaticity noise of a camera to generate a desired signal-to-noise ratio. The device may not create a mask of pixels with values above the threshold. The autohitch feature may operate at a distance (e.g., six meters) for computer vision object detection. Pixels below an accuracy threshold value may be sent to a separate set of computer vision models, whereas "nearer" pixels that have significant changes relative to the signal-to-noise ratio may be considered in the main computer vision model. The results from the main computer vision model and the separate computer vision models may be fused to provide an understanding of the entire scene (e.g., optical flow, detection of a trailer, etc.). The computer vision output may be input into the planning models, which may use the computer vision output data to determine the controls to actuate a vehicle (e.g., to cause the vehicle to approach a trailer hitch).

In one or more embodiments, a light, source (e.g. street light) may flicker (e.g., LED pulse-width modulation). A camera may detect flickering light sources and estimate $I^{L0}$ per each frame or pixel row. The derivation may assume constant illumination. Alternatively, a camera may use a rolling shutter technique to capture images (e.g., when light pulses are sufficiently aligned).

In one or more embodiments, the enhanced illumination-invariant imaging techniques may operate when a vehicle is stationary or when in motion (e.g. statefulness) where pixels would be attributable to a physical location that may be tracked with vehicle motion such that multiple measurements may occur over a number of vehicle/camera positions in 3-D space. The enhanced illumination-invariant imaging techniques may compare optical flow compared to vehicle motion to remove moving objects from the scene.

In one or more embodiments, the enhanced illumination invariant imaging techniques may be adopted in other automated/assisted driving scenarios where road surface visibility is not clearly identifiable. For example, the enhanced techniques herein may be applied to improving performance of computer vision-based features for detecting obstacles during automated parking features. For example, while backing into a parking spot under a tree with shadows shimmering on the road surface, the illumination-invariant technique will allow vision algorithms to better differentiate between road surface and obstacles. If the image signal processor and camera used are high frame, rate, the enhanced techniques herein may apply to a front highway speed driving feature. The automated driving feature can be used in highway automated driving for better algorithm performance during dusty, foggy or blizzard conditions. The surface reflectivity of dust or water particles can be calculated by above method and the ambient illuminance can be estimated based on the surface reflectivity, allowing devices to differentiate between road surface and obstacle, lane marking or the road edge with higher fidelity. The techniques herein may apply to mobile phones and the like, and may operate in near-infrared (NIR) and extrapolate into visible for RGB-NIR or multi-spectral cameras using known object properties, or at least partially solve the unknowns and extrapolate for the remaining data. The techniques herein may vary at speeds consistent with rolling shutter effects such that in a single image frame the color and intensity from the vehicle or other controlled device. The techniques herein may use a more complex BRDF to describe the reflectance model of the environment, and may be beneficial for RGB color correction in RGB-NIR where color estimation may be more difficult due to the color filter array pattern.

Illustrative Embodiments

Figure 1:
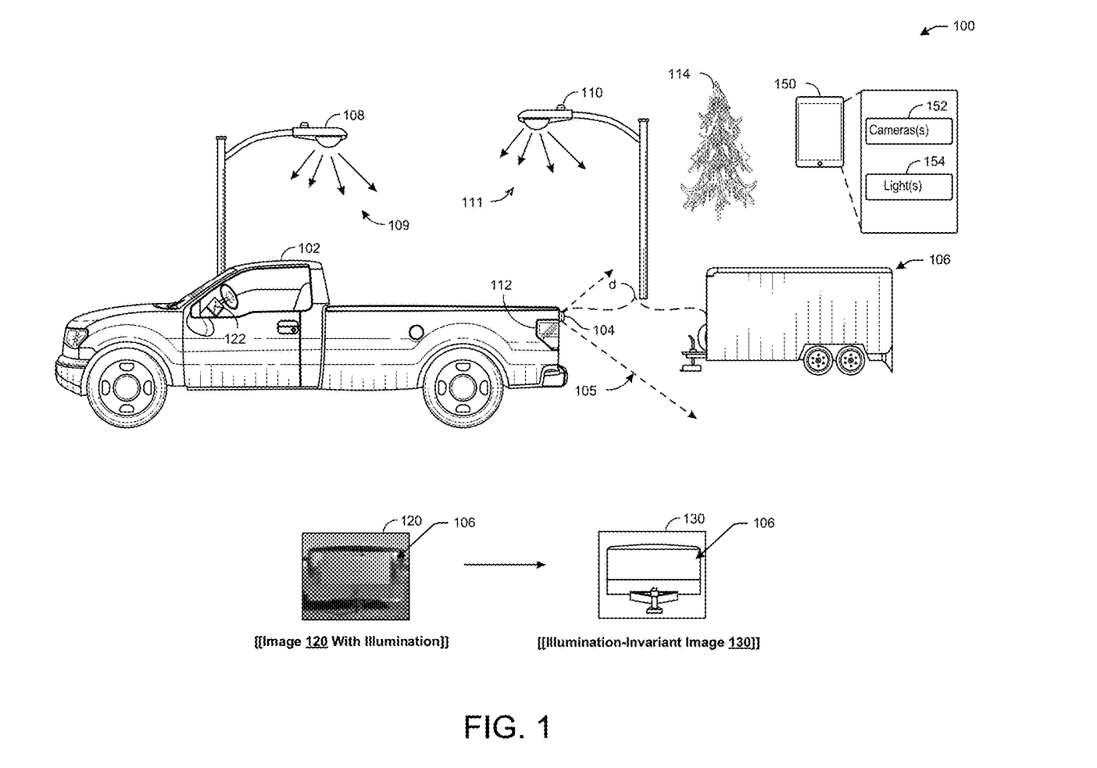
FIG. 1 depicts an illustrative system for providing enhanced illumination-invariant imaging in which techniques and structures for providing the systems and methods disclosed herein may be implemented.

Turning now to the drawings, FIG. 1 depicts an illustrative system 100 for providing enhanced illumination-invariant imaging in which techniques and structures for providing the systems and methods disclosed herein may be implemented.

Figure 5:
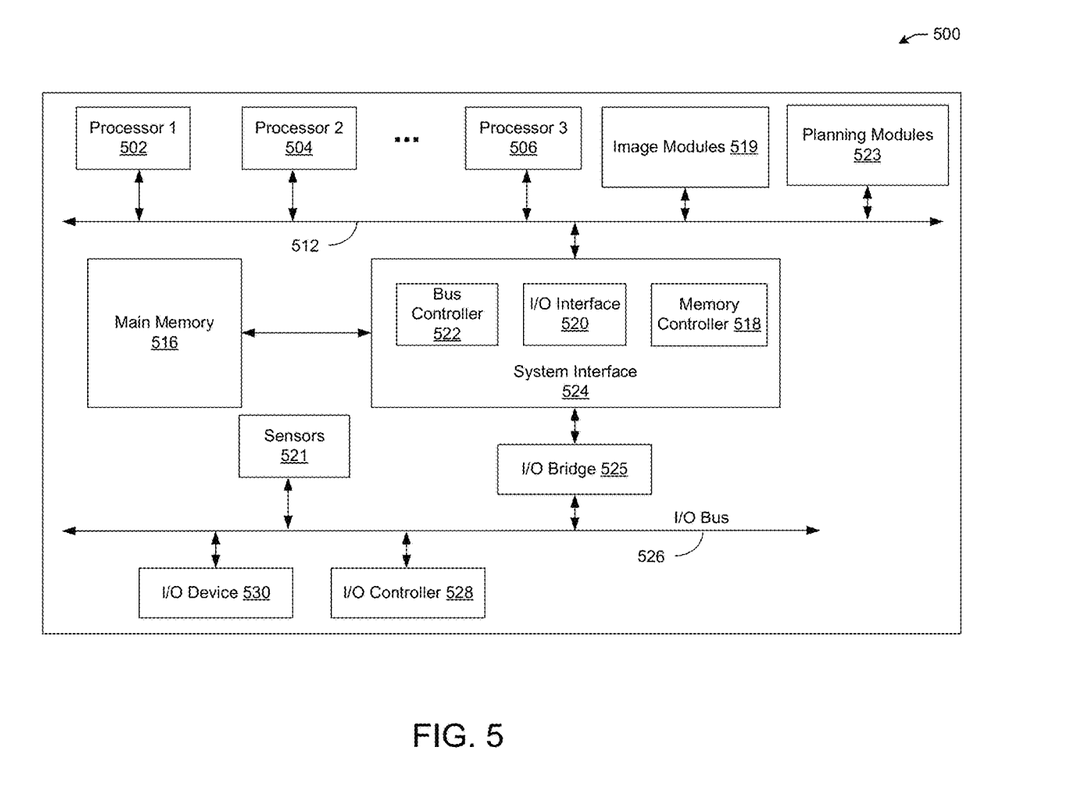
FIG. 5 is a block diagram illustrating an example of a computing device or computer system upon which any of one or more techniques (e.g., methods) may be performed, in accordance with one or more example embodiments of the present disclosure.

Referring to FIG. 1, the system 100 may include a vehicle 102 with a camera 104 (e.g., one or multiple cameras) having a field of view (FOV) 105. As shown, an object 106 (e.g., a trailer) may be within the FOV 105 of the camera 104, so the camera 104 may, when activated, capture image data that may represent at least a portion of the object 106. Nearby objects (e.g., tree 107) may produce shadows that may impact image data captured by the camera 104. When the vehicle 102 operates in low-light conditions, ambient light with unknown characteristics may be present. For example, ambient light source 108 (e.g., a street lamp) may emit light 109, and ambient light source 110 may emit light 111. Because of the low-light condition, the image data captured by the camera 104 may be supplemented by light emitted from another source, such as the tail light 112 (or some other vehicle light). However, because of the light 109, the light 111, any light emitted by the tail light 112, any shadows from objects (e.g., tree 114), image data of a captured image 120 may require color correction to produce an accurate illumination-image 130 for use by the vehicle (e.g., for display using a vehicle display 122, for use by vehicle systems that analyze image data, for a user device, and the like). For example, a distance d may represent the respective distance between the camera 104 and a respective location of pixel of the captured image 120 (e.g., in 3-D space). Applying Equation (3) above, processors of the vehicle 102 (e.g., as shown in FIG. 5) may determine a camera response $R^{x,E}$ of the camera 104, and applying Equations (4)-(9) above, the processors of the vehicle 102 may convert the image data of the captured image 120 to the illumination-invariant image 130.

In one or more embodiments, to convert the image data of the captured image 120 to the illumination-invariant image 130, the vehicle 102 or user device 150 (e.g., which may have one or more cameras 152 and one or more lights 154) may activate one or more light sources (e.g., the tail light 112 or other vehicle light, the one or more lights 154) while capturing the image 120, and may determine an ambient illumination (e.g., light from the image 120 caused by ambient light sources such as the ambient light source 108 and/or the ambient light source 110) using the Equations above. The vehicle 102 or user device 150 may convert the image data of the image 120 to the illumination-invariant image 130 (e.g., generating illumination-invariant image data based on the image data of the image 120 and the Equations above). The illumination-invariant image 130 may be an input to an autohitch computer vision model for, image analysis to detect objects. Data identifying objects in the illumination-invariant image 130 may be input to a planning model to determine controls for the vehicle 102, and the controls for the vehicle 102 may actuate the vehicle 102 (e.g., select speed, direction, etc. to approach an object, avoid an object, etc.).

In one or more embodiments, the image data of the captured image 120 may be captured by another device, such as the user device 150, which may have the one or more cameras 152 and the one or more lights 154 (e.g., flashlights) that the user device 150 may control (e.g., by activating the one or more cameras 152 and one or more lights 154). In this manner, the illumination-invariant imaging described herein is not limited to a vehicle device or system, and may be applied by other devices, as illumination-invariant imaging is not limited to use with vehicles.

In one or more embodiments, the vehicle display 122 and/or the user device 150 may include a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, an ultra mobile device (UMD), or the like.

Figure 2:
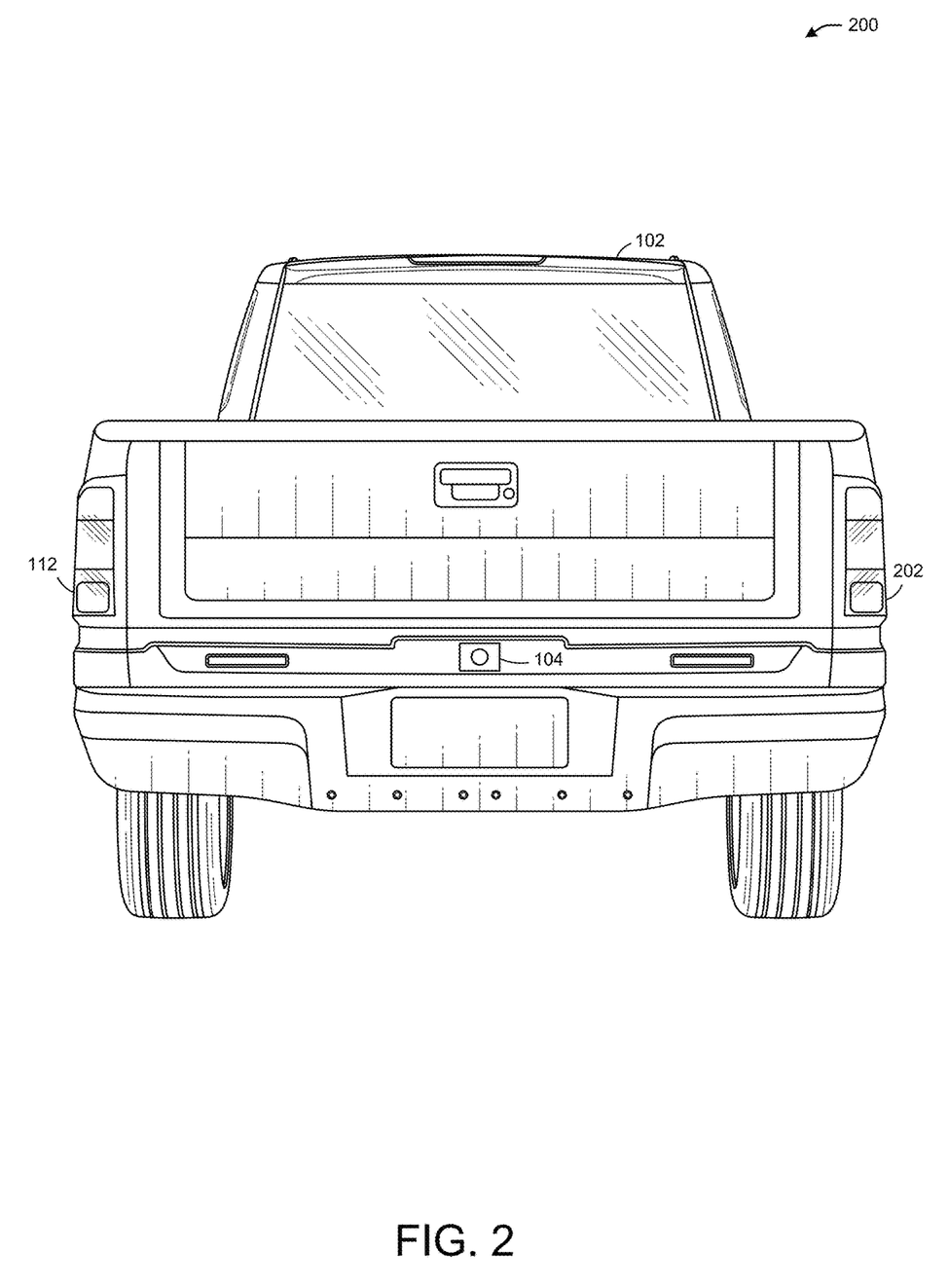
FIG. 2 depicts the vehicle of FIG. 1 for providing enhanced illumination-invariant imaging.

FIG. 2 depicts the vehicle 102 of FIG. 1 for providing enhanced illumination-invariant imaging.

Referring to FIG. 2, the vehicle 102 of FIG. 1 may include the tail light 112 of FIG. 1, the camera 104 of FIG. 1, and one or more additional vehicle lights (e.g., tail light 202). When the vehicle 102 detects a low-light environment (e.g., an environment near the vehicle 102 and including shadows), and when the camera 104 is activated, the vehicle 102 may activate the tail light 112 and/or the tail light 202 while capturing image data with the camera 104. In one or more embodiments, the vehicle 102 may illuminate a scene (e.g., using the tail light 112 and/or the tail light 202) using varying color and/or intensity levels over a short period of time so that the color variation occurs at rates faster than human eyes may detect (e.g., greater than 240 Hz). Rapidly changing the color of the tail light 112 and/or the tail light 202 would appear to a human observer as white light when pulsed in rapid succession. Once there is enough image data to accurately estimate a trailer or other object's position in an image scene, the vehicle 102 may stop flashing lights, and may, generate illumination-invariant image data by applying the Equations above.

Figure 3A:
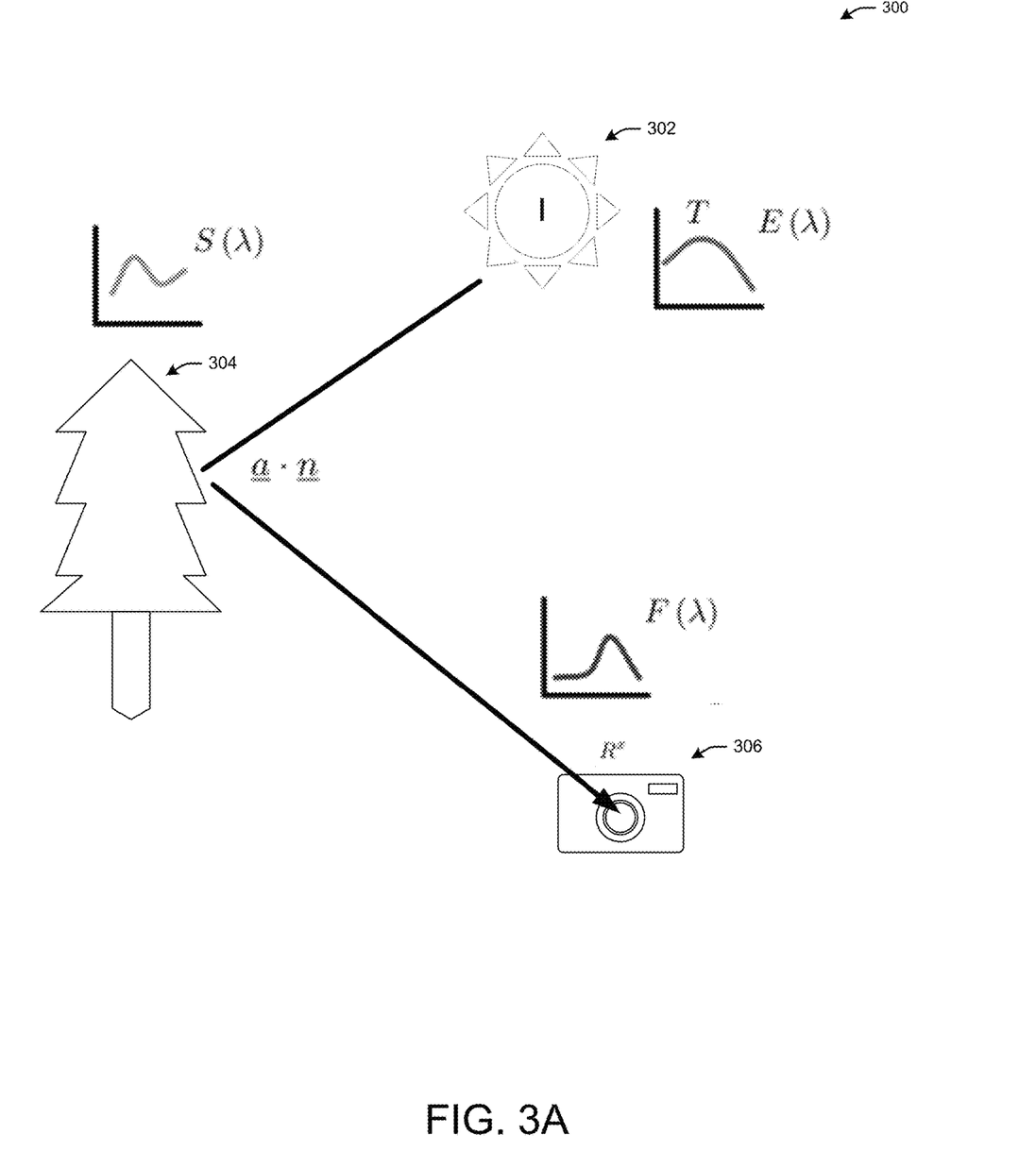
FIG. 3A depicts an illustrative system for generating image data.

FIG. 3A depicts an illustrative system 300 for generating image data.

Referring to FIG. 3A, a light source 302 (e.g., the sun) may emit, light as an ambient light source (e.g., similar to the ambient light sources 108 and 110 of FIG. 1). The light may reflect off of objects (e.g., a tree 304), and may be captured by a camera 306 (e.g., similar to the camera 104 of FIG. 1). I may represent the sum of vehicle light intensity and any ambient light intensity (e.g., the light 109 and 111 of FIG. 1, the intensity of light emitted by the tail light 112 and/or the tail light 202 of FIG. 2). (a,n) may represent unit vectors as a geometry term. $E(\lambda)$ may represent the spectral power density of external lighting (e.g., ambient lighting of the light sources 108 and 110 of FIG. 1). $S(\lambda)$ may represent an unknown reflectivity of a location x in an image frame (e.g., the image 120 of FIG. 1). $R^x$ may represent the camera response (e.g., of the camera 306) of the scene (e.g., the image data captured by the camera 306). The camera response may be represented by Equation (3) and used to generate illumination-invariant image data (e.g., the image 130 of FIG. 1).

Figure 3B:
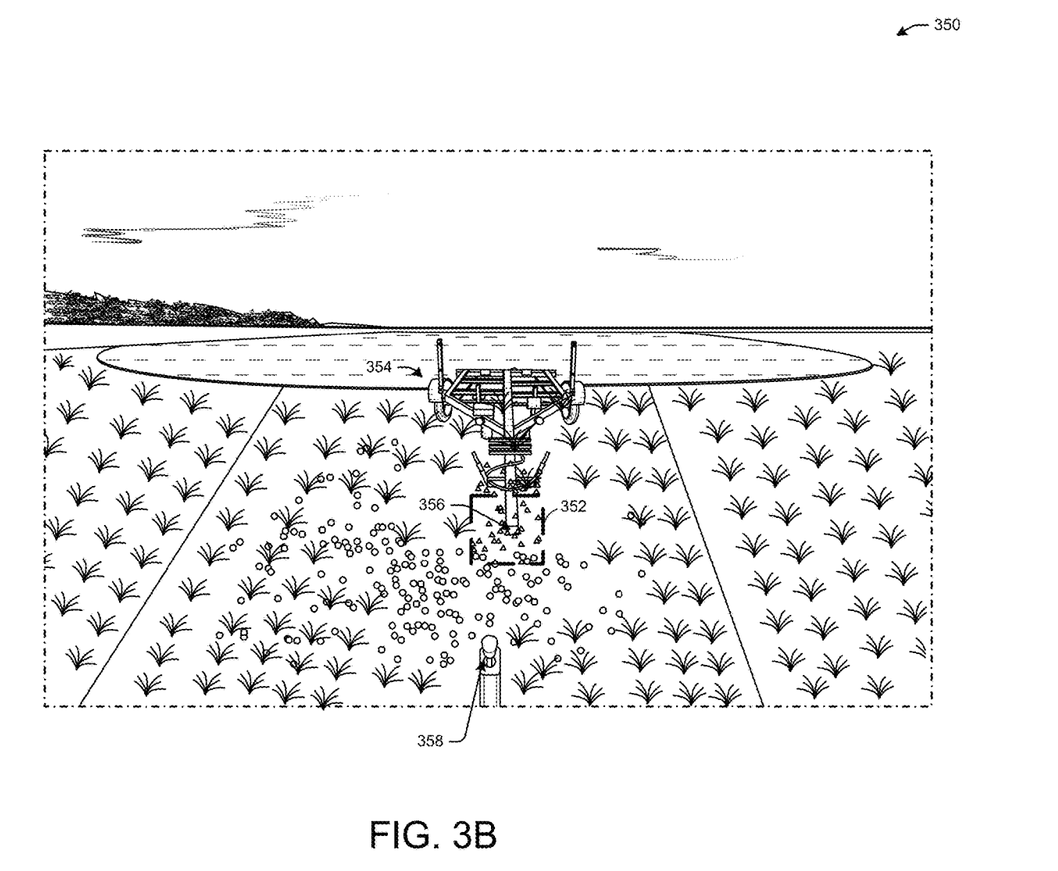
FIG. 3B depicts illustrative image data output based on feature point detection techniques.

FIG. 3B depicts illustrative image data 350 output based on feature point detection techniques.

Referring to FIG. 3B, the image data 350 may represent image data that has been converted to an illumination-invariant color space (e.g., similar to the illumination-invariant image 130 of FIG. 1), and may be used to identify feature points, for tracking and object detection. For example, the feature points 352 may be indicative of a trailer 354, specifically a tongue 356 of the trailer. Using the image data 350 to identify objects, a vehicle (e.g., the vehicle 102 of FIG. 1) may be actuated (e.g., to bring a trailer hitch mount 358 of the vehicle close to the trailer 354 to connect to the trailer 354). In this manner, use of the Equations above for generating the image data 350 may improve object detection and vehicle operation.

Figure 4:
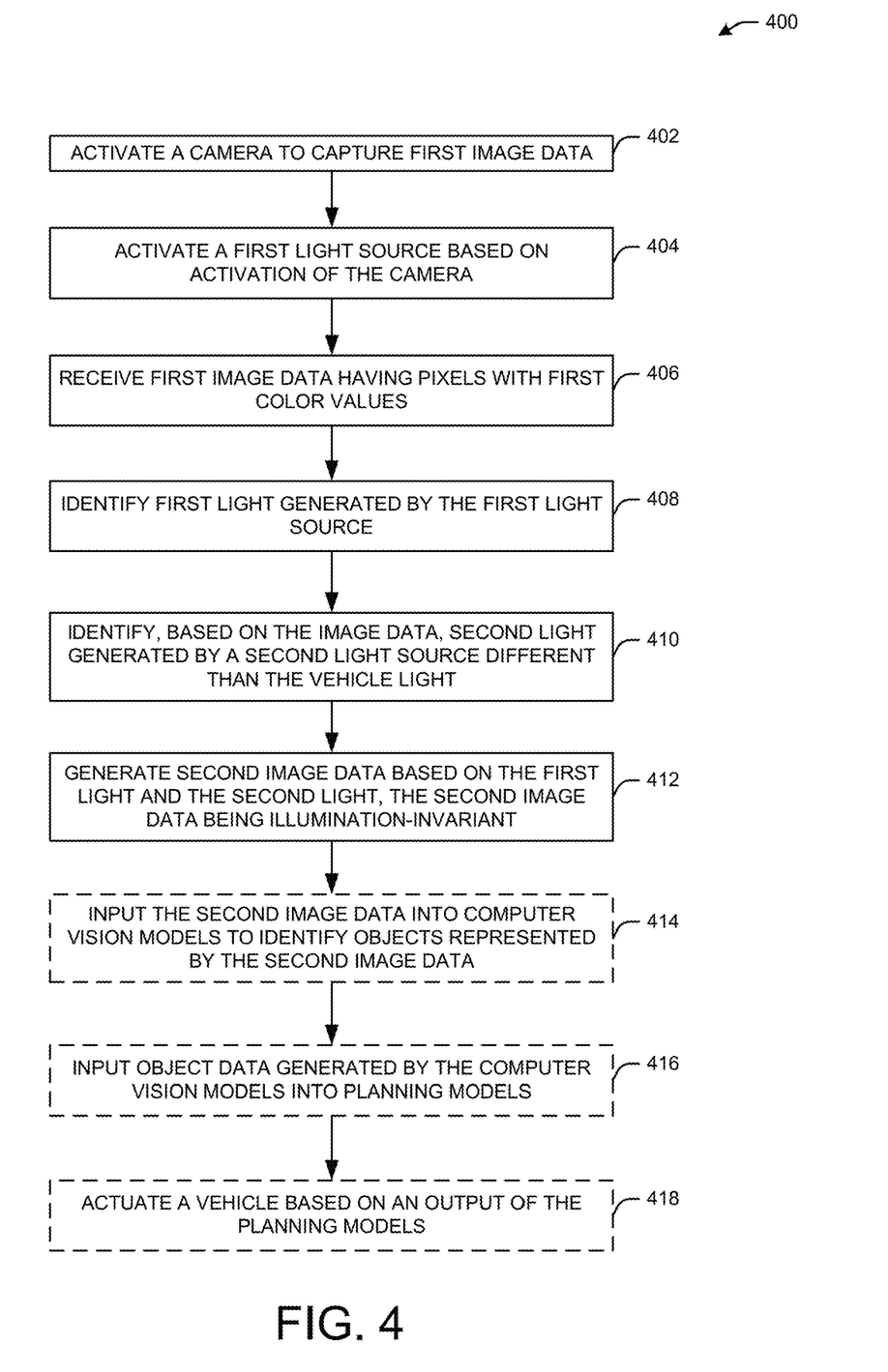
FIG. 4 is a flowchart of an example method for providing enhanced illumination-invariant imaging.

FIG. 4 is a flowchart of an example method 400 for providing illumination-invariant imaging.

At block 402, a system (e.g., the vehicle 102 of FIG. 1) may activate a camera (e.g., the camera 104 of FIG. 1) to capture first image data. The camera activation may occur in a low-light environment (e.g., as detected by vehicle sensors, based on a time of day, or the like) with or without shadows. The camera may capture the image data as part of a vehicle ADAS, such as to facilitate parking, backing up, hitching to a trailer, and the like.

At block 404, the system may activate a first light source (e.g., the tail light 112 and/or the tail light 202 of FIG. 2, the lights 154 of FIG. 1) while the camera is capturing image data. The vehicle light activation may occur based on a detection of a low-light environment, and may apply varying color and/or intensity levels over a short period of time so that the color variation occurs at rates faster than human eyes may detect (e.g., greater than 240 Hz). A location of an illuminant also may vary by selecting a source light (e.g., within a vehicle's tail light complex), for example, by using individual lighting within a light emitting diode (LED) strip on a vehicle's tail (e.g., compliant with government regulations regarding tail lights not changing illumination). Rapidly changing, the color of a tail light would appear to a human observer as white light when pulsed in rapid succession. Because a reverse tail light may be required to be white, such rapid pulsing would comply with relevant regulations. Once there is enough image data to accurately estimate a trailer or other object's position in an image scene, the vehicle may stop flashing lights (e.g., to allow a next step for an auto-hitch process, such as maneuvering a vehicle to a linear regression of a camera response, using a random sample consensus or another algorithm).

At block 406, the system may receive first image data (e.g., the captured image 120 of FIG. 1) having pixels with first color values (e.g., not yet adjusted for color correction). Because of the low-light, conditions, including the activated vehicle light and any ambient light sources, the first image data may not be accurate for system computers to process, and may not be convenient for human viewers (e.g., a vehicle driver). Therefore, illumination-invariant image data may be used to detect objects based on known and unknown light (e.g., known light from the first light source, unknown ambient light from the second and/or additional light sources).

At block 408, the system may identify first light generated by the first light source. For example, referring to FIG. 3) above, $E^{L1}(\lambda_i)$ may represent the color of the activated first light source. Because the activated first light source may be controlled by vehicle lighting (e.g., a body control module), the characteristics of the activated first light source may be known to the system.

At block 410, the system may use the image data to identify second light generated by a light source different than the vehicle light (e.g., the ambient light sources 108 and 110 of FIG. 1). In, particular, using the known activated light values, the system may determine the ambient light $I^{L0}E^{L0}(\lambda_i)$ using Equation (4) above. Based on the ambient light and the vehicle light, the system may determine the camera response according to Equation (3) above.

At block 412, the system may generate second image data based on the first and second light of the first image data. Using Equations (4)-(9) above, the system may generate illumination-invariant image data (e.g., the image 130 of FIG. 1). In this manner, rather than presenting and/or analyzing the first image data, the system may present and/or analyze the second image data to actuate or allow a vehicle driver to actuate a vehicle in low-light conditions because the second image data represents improved color data when compared to the first image data.

At block 414, optionally, the system may input the second image data into computer vision models for analysis and object detection (e.g., FIG. 3B). The computer vision models may generate an output of object data (e.g., data indicative of the presence of objects and their locations relative to the system).

At block 416, optionally, the system may input the object data generated by the computer vision models into planning models that may generate control commands (e.g., to cause the system, a vehicle, etc.) to perform actions based on the presence of the detected objects.

At block 418, optionally, the system may actuate a vehicle based on the second image data (e.g., by using the second image data to detect the presence of objects, their distance from a vehicle, etc., the system may control the velocity, direction, and the like of the vehicle).

The examples above are not meant to be limiting.

FIG. 5 is a block diagram illustrating an example of a computing device or computer system upon which any of one or more techniques (e.g., methods) may be performed, in accordance with one or more example embodiments of the present disclosure.

For example, the computing system 500 of FIG. 5 may include or represent the vehicle 102 of FIG. 1, in whole or in part. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512.

Processor bus 512, also known as the host bus or the front side bus, may be used to couple the processors 502-506, image modules 519 (e.g., capable of performing the method 400 of FIG. 4, including computer vision models), sensors 521 (e.g., for detecting light, for detecting objects, etc.), and planning modules 523 (e.g., for inputting the object detection data generated by the image modules 519 and generating control commands for the computing system 500) with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown).

System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506, and/or the image modules 519. Another type of user input device includes cursor control, such as a mouse, a trackball, or cursor direction keys for communicating direction information and command selections to the processors 502-506, and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the image modules 519. Main memory 516 also may be used for storing temporary variables or other intermediate information during execution of instructions by the processors 502-506 and/or the image modules 519. System 500 may include read-only memory (ROM) and/or other static storage device coupled to the processor bus 512 for storing static information and instructions for the processors 502-506 and/or the image modules 519. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be, read into main memory 516 from another machine-readable medium, such as a storage device. Execution of the sequences of instructions contained in main memory 516 may cause processors 502-506 and/or the image modules 519 to perform the process steps described herein. In alternative embodiments, circuitry may be used in place of or in combination with the software instructions. Thus, embodiments of the present disclosure may include both hardware and software components.

According to one embodiment, the processors 502-506 may represent machine learning models. For example, the processors 502-506 may allow for neural networking and/or other machine learning techniques used to operate the vehicle 102 of FIG. 1. For example, the processors 502-506 may include tensor processing units (TPUs) having artificial intelligence application-specific integrated circuits (ASICs).

According to one embodiment, the image modules 519 may cause presentation of image data (e.g., the image 130 of FIG. 1), and the processors 502-506 may cause actuation of a vehicle. For example, the processors 502-506 may function as a vehicle ADAS system to control the speed and direction of a vehicle for driving, parking, and the like.

In one or more embodiments, the computer system 500 may perform any of the steps of the processes described with respect to FIG. 4.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples, of non-removable data storage media include internal magnetic hard disks, solid state devices (SSDs), and the like. The one or more memory devices (not shown) may include volatile memory (e.g., dynamic random access memory (DRAM), static random, access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing, or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all, of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that, numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can." "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    activating, by at least one processor of a device, a camera to capture first image data exterior to the device;
    while the camera is capturing the first image data, based on the activation of the camera, activating, by the at least one processor, a first light source at a first controlled intensity, a first controlled frequency, and a first controlled direction;
    while the camera is capturing the first image data, based on the activation of the camera, activating, by the at least one processor, the first light source at a second controlled intensity, a second controlled frequency, and a second controlled direction;
    receiving, by the at least one processor, the first image data, the first image data comprising pixels having first color values;
    identifying, by the at least one processor, first light generated by the first light source at the first controlled intensity, the first controlled frequency, and the first controlled direction while the camera is capturing the first image data;
    identifying, by the at least one processor, second light generated by the first light source at the second controlled intensity, the second controlled frequency, and the second controlled direction while the camera is capturing the first image data;
    identifying, by the at least one processor, based on the first image data, third light generated by a second light source different than the first light source;
    determining, by the at least one processor, a first response of the camera based on a first product of the first controlled intensity and a first power spectral density of the first light source divided by a first area between the first light source and a first pixel of the first image data, added to a first estimate of an illumination of the first light and the third light;
    determining, by the at least one processor, a second response of the camera based on a second product of the second controlled intensity and a second power spectral density of the first light source divided by a second area between the first light source and a second pixel of the first image data, added to a second estimate of the illumination of the second light and the third light;
    determining, by the at least one processor, based on the first response of the camera and the second response of the camera, the illumination of the second light and the third light;
    determining, by the at least one processor, a third response of the camera based on the second product of the second controlled intensity and the second power spectral density of the first light source divided by the second area between the first light source and the second pixel of the first image data, added to the illumination of the second light and the third light;
    converting, by the at least one processor, by applying a spectral transform matrix to the third response of the camera, the first image data to second image data in an illumination-invariant color space;
    identifying, by the at least one processor, an object represented by the second image data in the illumination-invariant color space; and
    causing actuation, by the at least one processor, of a vehicle based on the object.

2. The method of claim 1, wherein the device is a smartphone, and wherein the first light source is a flashlight.

3. The method of claim 1, wherein the device is associated with a vehicle.

4. The method of claim 3, wherein the first light source is a tail light of the vehicle.

5. The method of claim 1, wherein activating the first light source further comprises flickering the first light source using pulse-wave modulation.

6. The method of claim 1, wherein the third light is generated by the second light source and a third light source.

7. The method of claim 1, wherein identifying the object is based on inputting the second image data to a computer vision model, the method further comprising:
    generating, based on data indicative of the object, vehicle planning data; and
    causing actuation of a vehicle based on the vehicle planning data.

8. A system, comprising:
    a camera;
    a first light source; and memory coupled to at least one processor, the at least one processor configured to:
   activating the camera to capture first image data exterior to the system;
   while the camera is capturing the first image data, based on the activation of the camera, activating the first light source at a first controlled intensity, a first controlled frequency, and a first controlled direction;
   while the camera is capturing the first image data, based on the activation of the camera, activating the first light source at a second controlled intensity, a second controlled frequency, and a second controlled direction;
   receive the first image data, the first image data comprising pixels having first color values;
   identify first light generated by the first light source at the first controlled intensity, the first controlled frequency, and the first controlled direction while the camera is capturing the first image data;
   identify second light generated by the first light source at the second controlled intensity, the second controlled frequency, and the second controlled direction while the camera is capturing the first image data;
   identifying, based on the first image data, third light generated by a second light source different than the first light source;
   determine a first response of the camera based on a first product of the first controlled intensity and a first power spectral density of the first light source divided by a first area between the first light source and a first pixel of the first image data, added to a first estimate of an illumination of the first light and the third light;
   determine a second response of the camera based on a second product of the second controlled intensity and a second power spectral density of the first light source divided by a second area between the first light source and a second pixel of the first image data, added to a second estimate of the illumination of the second light and the third light;
   determine, based on the first response of the camera and the second response of the camera, the illumination of the second light and the third light;
   determine a third response of the camera based on the second product of the second controlled intensity and the second power spectral density of the first light source divided by the second area between the first light source and the second pixel of the first image data, added to the illumination of the second light and the third light;
   convert, by applying a spectral transform matrix to the third response of the camera, the first image data to second image data in an illumination-invariant color space;
   identify an object represented by the second image data in the illumination-invariant color space; and
   cause actuation of a vehicle based on the object.

9. The system of claim 8, further comprising a smartphone, and wherein the second light source is a flashlight of the smartphone.

10. The system of claim 8, wherein the system is associated with a vehicle.

11. The system of claim 10, wherein the first light source is a tail light of the vehicle.

12. A device comprising memory coupled to at least one processor, the at least one processor configured to:
   activate a camera to capture first image data exterior to the device;
   while the camera is capturing the first image data, based on the activation of the camera, activating a first light source at a first controlled intensity, a first controlled frequency, and a first controlled direction;
   while the camera is capturing the first image data, based on the activation of the camera, activate the first light source at a second controlled intensity, a second controlled frequency, and a second controlled direction;
   receive the first image data, the first image data comprising pixels having first color values;
   identify first light generated by the first light source at the first controlled intensity, the first controlled frequency, and the first controlled direction while the camera is capturing the first image data;
   identify second light generated by the first light source at the second controlled intensity, the second controlled frequency, and the second controlled direction while the camera is capturing the first image data;
   identify, based on the first image data, third light generated by a second light source different than the first light source;
   determine a first response of the camera based on a first product of the first controlled intensity and a first power spectral density of the first light source divided by a first area between the first light source and a first pixel of the first image data, added to a first estimate of an illumination of the first light and the third light;
   determine a second response of the camera based on a second product of the second controlled intensity and a second power spectral density of the first light source divided by a second area between the first light source and a second pixel of the first image data, added to a second estimate of the illumination of the second light and the third light;
   determine, based on the first response of the camera and the second response of the camera, the illumination of the second light and the third light;
   determine, a third response of the camera based on the second product of the second controlled intensity and the second power spectral density of the first light source divided by the second area between the first light source and the second pixel of the first image data, added to the illumination of the second light and the third light;
   convert, by applying a spectral transform matrix to the third response of the camera, the first image data to second image data in an illumination-invariant color space;
   identify an object represented by the second image data in the illumination-invariant color space; and
   cause actuation of a vehicle based on the object.

13. The device of claim 12, wherein the device is a smartphone, and wherein the second light source is a flashlight.

14. The device of claim 12, wherein the device is associated with a vehicle, and wherein the at least one processor is further configured to cause actuation of the vehicle based on the second image data.

15. The device of claim 12, wherein to activate the first light source further comprises to flicker the first light source using pulse-wave modulation.

16. The device of claim 12, wherein the first light source is a light of the vehicle.

\* \* \* \* \*